(12) United States Patent
Lim et al.

(10) Patent No.: US 7,895,444 B2
(45) Date of Patent: Feb. 22, 2011

(54) METHOD AND APPARATUS FOR PREVENTING ILLEGAL ACCESS USING PROHIBIT KEY IN ELECTRONIC DEVICE

(75) Inventors: Woo-Gyu Lim, Seoul (KR); Woo-Jin Yun, Suwon-si (KR); Jae-Min Jung, Seoul (KR); Sung-Min Kwak, Suwon-si (KR); Se-Wook Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 819 days.

(21) Appl. No.: 11/860,950

(22) Filed: Sep. 25, 2007

(65) Prior Publication Data

US 2008/0077985 A1 Mar. 27, 2008

(30) Foreign Application Priority Data

Sep. 25, 2006 (KR) .................. 10-2006-0092682

(51) Int. Cl.
*H04L 9/00* (2006.01)
*G06F 11/00* (2006.01)
*G06F 12/14* (2006.01)

(52) U.S. Cl. .............. 713/183; 713/184; 713/185; 726/27; 726/28; 726/29; 726/30

(58) Field of Classification Search ............. 713/183
See application file for complete search history.

(56) References Cited

U.S. PATENT DOCUMENTS

2006/0215360 A1* 9/2006 Lin et al. .................. 361/685

FOREIGN PATENT DOCUMENTS

KR 1020010028146 4/2001

* cited by examiner

*Primary Examiner*—Longbit Chai
(74) *Attorney, Agent, or Firm*—The Farrell Law Firm, P.C.

(57) ABSTRACT

A method and an apparatus for preventing illegal access by using a prohibit key in an electronic device, is provided. The method includes determining a variable prohibit key which is dynamically varied according to a predetermined variable factor, if a password is input to access a system, determining the existence of the determined variable prohibit key in the input password, and rejecting an access of a user to the system, if the variable prohibit key exists in the input password.

18 Claims, 3 Drawing Sheets

METHOD AND APPARATUS FOR PREVENTING ILLEGAL ACCESS USING PROHIBIT KEY IN ELECTRONIC DEVICE

PRIORITY

This application claims priority under 35 U.S.C. §119(a) to a Korean Patent Application filed in the Korean Intellectual Property Office on Sep. 25, 2006 and assigned Serial No. 2006-92682, the contents of which are incorporated herein by reference.

BACKGROUND OF THE INVENTION

1. Field of the Invention

The present invention relates to an apparatus and method for preventing illegal access to an electronic device by using a prohibit key, and more particularly, to an apparatus and method for preventing illegal access of an unauthorized user to an electronic device, by using a dynamically variable key.

2. Description of the Related Art

The rapid growth the of electronic field industry has brought about widespread use of electronic devices, and accordingly, people's concern and interest about the illegal access to the electronic devices and ways to protect personal information and property information stored and managed in electronic devices is higher than ever. Generally, in order to protect the personal information and information about user's property, a user of an electronic device sets a password known only to himself, so that access to a system and to his personal information and property information is only accepted when the preset password is correctly input.

However, the abovementioned way of accessing a system through inputting a password, has some drawbacks. If the password is exposed to the others or if someone attempts to crack the password the user may become a victim of identity theft. Accordingly, a variety of methods are being studied to protect a system from password exposure and malicious password cracking.

For example, one way to protect the system is to reject the illegal access of the other users, using a prohibit key. The use of the prohibit key has enabled not only the prevention of illegal access to the system, but also a report on such attempt to illegally access the system to a security personnel or authority to deal with the problem early so that user can be protected with more aggressive and active measures.

However, the use of prohibit key has a loophole and can endanger the security, if the prohibit key is exposed to the others. That is, if an unauthorized person who obtains prohibit the key tries to access the system, the chances to match the password are much higher because the unauthorized person can just combine the keys other than the prohibit key. For example, if the fact that number '9' is set to a prohibit key is known to the unauthorized person, the possibility that the person will match the password by combining from 0 to 8 is higher than combining numbers all the way from 0 to 9.

SUMMARY OF THE INVENTION

An aspect of the present invention is to substantially solve at least the above problems and/or disadvantages and to provide at least the advantages below. Accordingly, an aspect of the present invention is to provide a method and an apparatus for preventing illegal access to an electronic device using a prohibit key.

Another aspect of the present invention is to provide a method and an apparatus for preventing illegal access of an unauthorized user, by using a dynamically-variable prohibit key.

Yet another aspect of the present invention is to provide a method and an apparatus for dynamically varying a prohibit key, in order to prevent exposure of a prohibit key in an electronic device.

According to one aspect of the present invention, a method for preventing illegal access in an electronic device is provided, which includes if a password is input to access a system, determining a variable prohibit key which is dynamically varied according to a predetermined variable factor, determining the existence of the determined variable prohibit key in the input password, and if the variable prohibit key exists in the input password, rejecting an access of a user to the system.

According to another aspect of the present invention, a method for setting a prohibit key to prevent illegal access in an electronic device is provided, which includes if a password register event has occurred, determining whether a prohibit key is set for the protection of a system and upon determination that the prohibit key is set, setting a variable factor to dynamically vary the prohibit key and storing the set variable factor.

According to a further aspect of the present invention, an apparatus for preventing illegal access in an electronic device is provided, which includes a storage unit for storing a variable factor previously set by a user, a password-matching unit for, if a password is input to access a system, determining a variable prohibit key which is dynamically varied according to the variable factor, and determining the existence of the determined variable prohibit key in the input password, and a control unit for, if the variable prohibit key exists in the input password, rejecting an access of the user to the system, and operating a system protection program.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

An apparatus and a method for actively protecting a system, which is capable of setting a dynamically-variable prohibit key in an electronic device, detecting an input of the dynamically-variable prohibit key, and determining an illegal access of an authorized user, will be explained in detail below.

Figure 1:
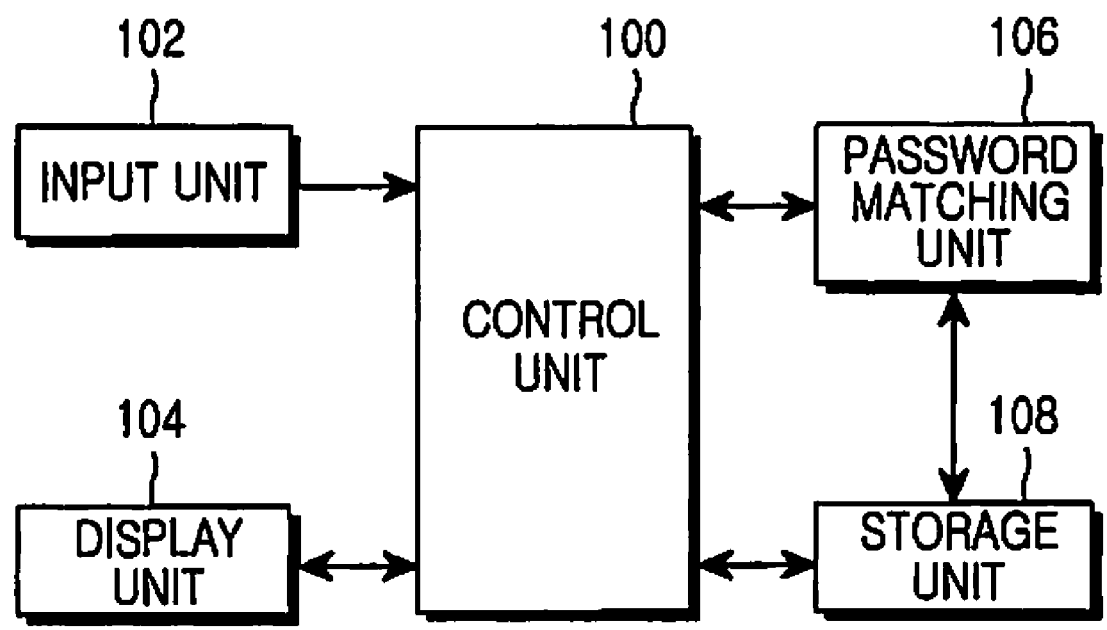
FIG. 1 illustrates the components of an electronic device according to the present invention.

FIG. 1 illustrates the components of an electronic device according to the present invention. Referring to FIG. 1, the electronic device includes a control unit 100, an input unit 102, a display unit 104, a password-matching unit 106, and a storage unit 108.

Referring to FIG. 1, the control unit 100 handles controlling and processing of overall operations of the electronic device, and in particular, if a prohibit key setting event has occurred, the control unit 100 operates to receive an input of a fixed or variable prohibit key factor from the input unit 102 and store the received input at the storage unit 108. If a user authentication event has occurred for the access to the system, the control unit 100 causes the display unit 104 to display a message asking for a password input, and causes the password being input through the input unit 102 to be output to the password-matching unit 106. If a password-matching signal is input from the password-matching unit 106, the control unit 100 accept the user access to the system, and if a password mismatching signal is input, the control unit 100 indicates to the user that a incorrect password has been input, and rejects the system access. If a signal, indicative of the existence of a prohibit key in the input password, is input from the password-matching unit 106, the control unit 100 controls the corresponding function so as to operate a system protection program to keep the user from accessing the system.

The input unit 102 includes a plurality of function keys, and provides the control unit 100 with the data corresponding to the keys pressed by the user. More particularly, according to the present invention, the input unit 102 may receive the password, the fixed prohibit key, and a variable factor of the variable prohibit key, and provides the control unit 100 with the received information.

The display unit 104 displays status information, and texts including a limited number of figures, as the information is generated during the operation of the system. According to the present invention, the display unit 104 may display a message which asks a user to input a password, and a message which indicates that an incorrect password has been input, according to the control of the control unit 100.

The password-matching unit 106, upon receiving a user-input password from the control unit 100, reads out a preset password previously set by the user from the storage unit 108, and determines whether the newly input password matches the preset password. If these two passwords match, the password-matching unit 106 outputs a password-matching signal to the control unit 100, and if the passwords do not match, the password-matching unit 106 checks the prohibit key set by the user. That is, if the user has set a fixed prohibit key, the password-matching unit 106 checks a fixed prohibit key previously stored at the storage unit 108. If the user has set a variable prohibit key which varies dynamically according to time, the password-matching unit 106 reads out a variable factor previously stored at the storage unit 108 and checks the variable prohibit key based on the variable factor. For example, if the variable factor is set to the second digit of the 'minute' unit of the time information, and if the current time is 11:03, Sep. 14, 2006, the variable prohibit key at the current time point is '3'.

The password-matching unit 106 determines whether the input password includes the checked prohibit key, and outputs a password mismatching signal to the control unit 100, if the input password does not include the prohibit key, or outputs a prohibit key existence signal to the control unit 100, if the input password includes the prohibit key.

The storage unit 108 may include a Read-Only Memory (ROM), a Random Access Memory (RAM), and a flash ROM. The ROM stores micro-codes of programs for the processing and controlling of the control unit 100 and a variety of other reference data. According to the present invention, the storage unit 108 may store a system protection program to prevent an access to the system, if the input password includes a prohibit key. The RAM operates as a working memory, and stores temporary data, which is generated during programs operation. According to the present invention, the flash ROM may store a fixed prohibit key, a variable factor and a password, which are set by the user.

The fixed prohibit key and the dynamically-variable prohibit key according to time, may be selectively used according to the setting by the user. That is, according to the need of a user, the fixed prohibit key alone may be used, the variable prohibit key alone may be used, or both the fixed prohibit key and the variable prohibit key may be used altogether.

Figure 2:
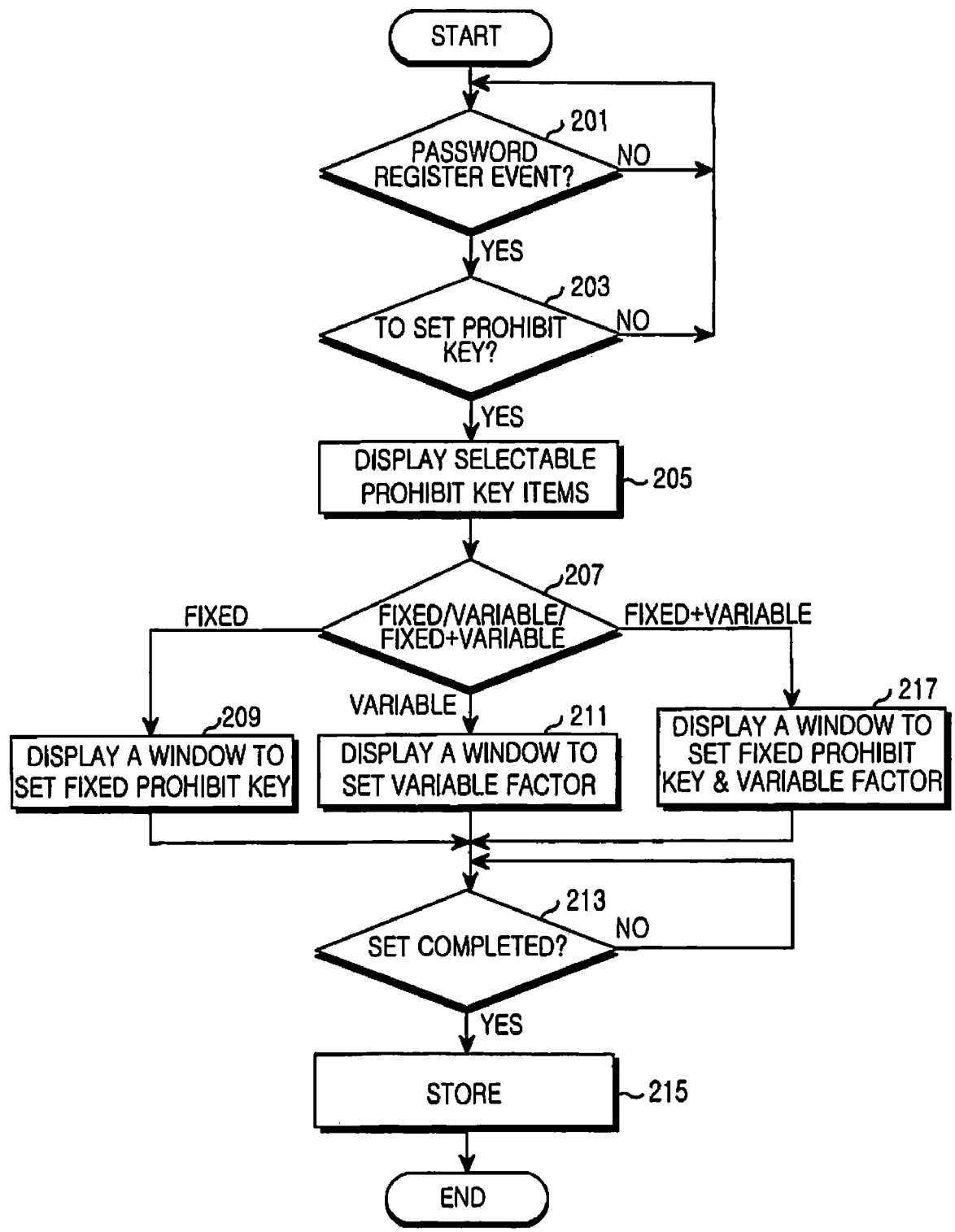
FIG. 2 illustrates the process of setting a prohibit key in an electronic device according to the present invention.

FIG. 2 illustrates the process of setting a prohibit key in an electronic device according to the present invention.

Referring to FIG. 2, the electronic device determines whether a password register event is occurred by a user in step 201. If the password register event is occurred, the electronic device determines whether to prevent illegal access of an unauthorized user and whether to set a prohibit key and protect the system in step 203.

Upon determination that the prohibit key is to be set, the electronic device displays a list of selectable prohibit keys items for setting on the display unit 104 in step 205. For example, the electronic device may display the prohibit keys in the order of:
1) fixed prohibit key,
2) variable prohibit key, and
3) fixed+variable prohibit key.

The electronic device determines whether a selection is made from the displayed list in step 207.

If the fixed prohibit key item is selected from the list, the electronic device displays a window to set a fixed prohibit key in step 209, and proceeds to step 213 to determine whether the setting of the fixed prohibit key is completed. The user may set a plurality of fixed prohibit keys. For example, the user may select both '2' and '5' as the prohibit keys.

If the setting of the prohibit key is completed, the electronic device stores the set prohibit key in step 215 and terminates the process according to this embodiment of the present invention.

If the variable prohibit key item is selected from the list, the electronic device displays a window to set a variable factor which dynamically varies the prohibit key according to time change in step 211, and proceeds to step 213 to determine whether the setting of the variable factor is completed or not. The variable factor to dynamically vary the variable prohibit key may be set according to a time unit, such as year, month, date, hour, or minute. For example, a user may set a variable prohibit key varying in every minute, by setting the variable factor based on the second digit of the unit of 'minute'. Alternatively, the user may set a variable prohibit key varying in every tenth hour, by setting the variable factor based on the first digit of the unit of 'hour'. The user also may set a plurality of variable prohibit keys. For example, the user may set one variable factor based on the second digit of the unit of 'minute', and setting the other variable factor based on the first digit of the unit of 'hour'.

If the setting of the variable factor is completed, the electronic device stores the set variable factor in step 215 and terminates the process according to this embodiment of the present invention.

If an item, which uses both the fixed prohibit key and the variable prohibit key, is selected from the item, the electronic device displays a window to set the fixed prohibit key and the variable factor in step 217, and proceeds to step 213 to determine whether the setting of the fixed prohibit key and the variable factor is completed. For example, one fixed prohibit key may be set, and two variable factors for two prohibit keys may be set.

If the setting of the fixed prohibit key and the variable factor is completed, the electronic device stores the set fixed prohibit key and the variable factor, and terminates the process according to this embodiment of the present invention.

Figure 3:
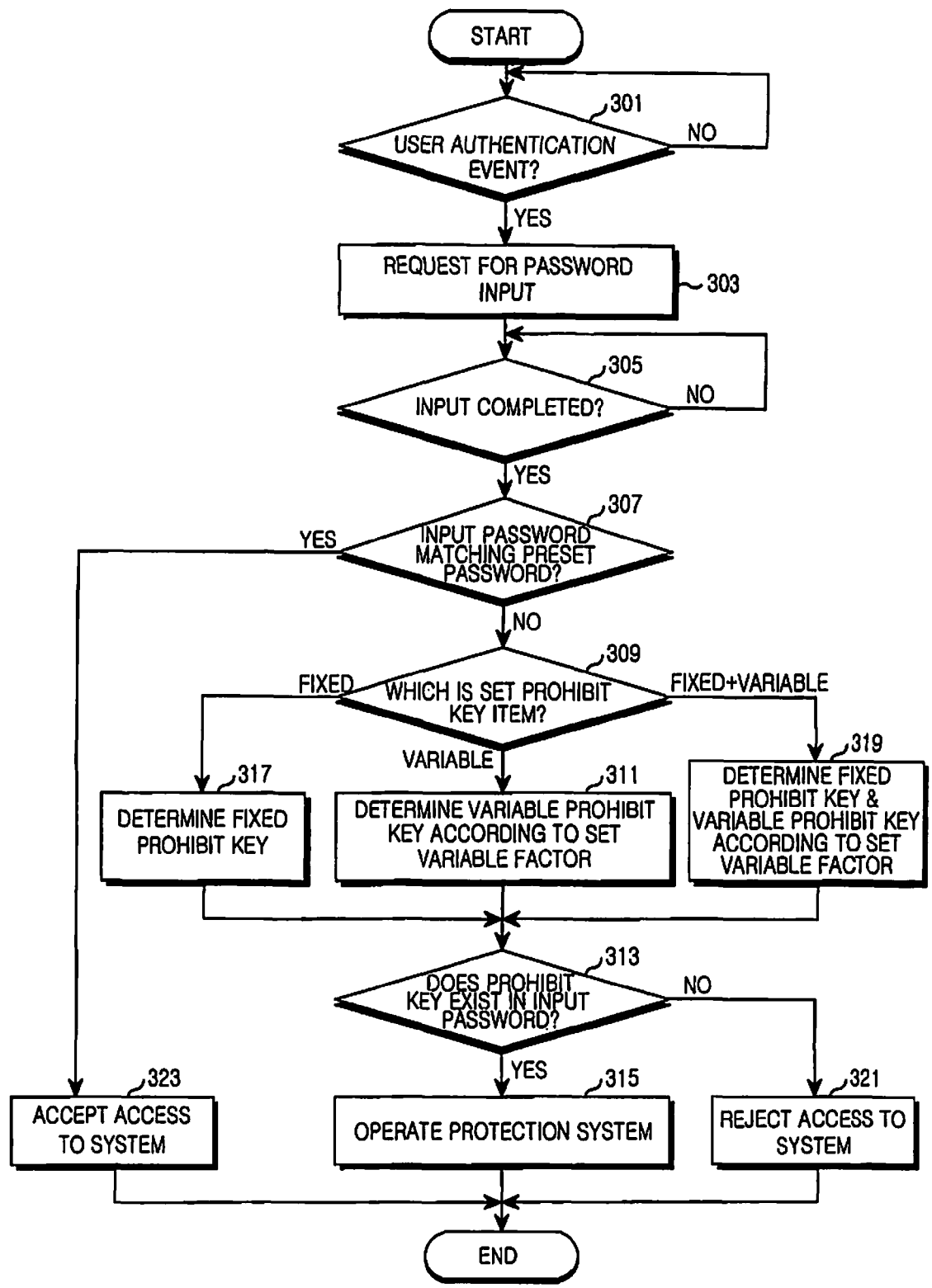
FIG. 3 illustrates the process of preventing illegal access to an electronic device, by using a prohibit key according to the present invention.

FIG. 3 illustrates the process of preventing illegal access to an electronic device, using a prohibit key, according to the present invention.

Referring to FIG. 3, the electronic device determines whether a user authentication event is occurred for an access to a system in step 301. If a user authentication event is occurred, the electronic device requests that the user input a password in step 303. For example, the electronic device may display a message requesting for an input of a password on the display unit 104, or output such request through a speaker. The electronic device determines whether the password input of the user is completed in step 305. If the password input is completed, the electronic device compares the input password with a preset password by a user and determines whether the two passwords match in step 307.

If the input password and the preset password match, the electronic device proceeds to step 323 to accept the access of the user to the system and terminates the process according to this embodiment of the present invention.

If the input password and the preset password do not match, the electronic device checks the type of prohibit key that is previously set by the user in step 309. That is, the electronic device determines whether the prohibit key previously set by the user includes a fixed prohibit key, a variable prohibit key, or both the fixed and variable prohibit keys.

If the prohibit key previously set by the user is the fixed prohibit key, the electronic device checks the fixed prohibit key in step 317, and determines, in step 313, whether the input password includes a prohibit key corresponding to the fixed prohibit key checked as above.

If the prohibit key previously set by the user is the variable prohibit key, the electronic device reads out a variable factor from the storage unit 108 in step 311 and determines a variable prohibit key corresponding to the variable factor at the current time point. For example, if the variable factor is the first digit of the unit of 'minute' of the time units, and if the current time is 11:03, Sep. 14, 2006, the electronic device determines that the variable prohibit key at the current time point to be '0'. The electronic device determines, in step 313, whether the input password includes the prohibit key determined as explained above.

If the prohibit key previously set by the user is the fixed and variable prohibit key, the electronic device proceeds to step 319 to determine a variable prohibit key corresponding to the variable factor at the current time point and the fixed prohibit key. The electronic device then proceeds to step 313 to determine whether the input password includes the prohibit key determined as explained above.

Upon determination that the input password includes a prohibit key in step 313, the electronic device determines the input password to be an illegal access, and proceeds to step 315 to operate the system protection program to protect the system from the access of the current user. The system protection program not only bans the access of the current user to the system, but also takes the active measures to the illegal access, such as, reporting a security authority or system of the attempt of illegal access. The electronic device then terminates the process according to this embodiment of the present invention.

Upon determination that the input password does not include a prohibit key in step 313, the electronic device determines the input password to be a simple input error, and proceeds to step 321 to notify the current user that user authentication has been failed due to mismatching of password, and that the user is not authorized to access the system, and bans the access of the user to the system. The electronic device then terminates the process according to this embodiment of the present invention.

According to the dynamic variation of the variable prohibit key according to time, the prohibit key may be changed to a number or a letter which is included in the preset password. Accordingly, an access of a user may be erroneously rejected due to the variable prohibit key, even when a user inputs a correct password. In order to solve the above problem, whether the input key matches the password is first determined, before determining whether the key input by the user includes a prohibit key, so that the presence of the variable prohibit key is determined only when the input key does not matches the password.

Alternate embodiments of the present invention can also comprise computer readable codes on a computer readable medium. The computer readable medium includes any data storage device that can store data that can be read by a computer system. Examples of a computer readable medium include magnetic storage media (such as Read Only Memory (ROM), floppy disks, and hard disks, among others), optical recording media (such as Compact Disk (CD)-ROMs or Digital Versatile Disks (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

According to the present invention, illegal access of an unauthorized user to the electronic device can be prevented by use of a prohibit key, such that system can be protected from unauthorized users and exposure of the prohibit key to protect the system can be securely kept. Additionally, by using a combination of a prohibit key, which dynamically varies according to time, and a fixed prohibit key, security can be strengthened.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for preventing illegal access in an electronic device, comprising:
configuring at least one processor to perform the functions of:
determining a variable prohibit key which is dynamically varied according to a predetermined variable factor, if a password is input to access a system;
determining existence of the determined dynamically-variable prohibit key in the input password only when the input password does not match an authorized password; and
rejecting an access of a user to the system, if the determined dynamically-variable prohibit key exists in the input password.

2. The method of claim 1, wherein the step of determining the existence of the determined variable prohibit key comprises:
- determining whether the input password matches a preset password; and
- if the input password does not match the preset password, determining whether the determined variable prohibit key exists in the input password.

3. The method of claim 1, wherein the variable factor is set based on a time unit, including a year, a month, a date, an hour and a minute.

4. The method of claim 1, wherein the variable factor is set to a plurality of factors.

5. The method of claim 1, wherein the variable prohibit key corresponds to a time unit, which is indicated by the variable factor when the password is input.

6. The method of claim 1, further comprising, if the determined variable prohibit key exists in the input password, operating a system protection program to transmit an emergency call signal to a predetermined user or system.

7. The method of claim 1, further comprising, if the determined variable prohibit key exists in the input password, notifying the user that access to the system is unauthorized.

8. A method for setting a prohibit key in an electronic device, comprising:
- configuring at least one processor to perform the functions of:
- determining whether a prohibit key is set for the protection of a system, if a password register event occurs;
- setting a variable factor to dynamically vary the prohibit key and store the set variable factor, if the prohibit key is set;
- determining existence of the determined dynamically-variable prohibit key in the input password only when the input password does not match an authorized password; and
- rejecting an access of a user to the system, if the determined dynamically-variable prohibit key exists in the input password.

9. The method of claim 8, wherein the variable factor is set based on a time unit, including a year, a month, a date, an hour and a minute.

10. The method of claim 8, wherein the variable factor is set to a plurality of factors.

11. An apparatus for preventing illegal access in an electronic device, comprising:
- at least one processor and memory;
- a storage unit for storing a variable factor previously set by a user;
- a password-matching unit for, if a password is input to access a system, determining a variable prohibit key which is dynamically varied according to the variable factor, and determining the existence of the determined dynamically-variable prohibit key in the input password only when the input password does not match an authorized password; and
- a control unit for rejecting an access of the user to the system, if the dynamically-variable prohibit key exists in the input password.

12. The apparatus of claim 11, wherein the variable factor is set based on a time unit including, a year, a month, a date, an hour and a minute.

13. The apparatus of claim 11, wherein the variable factor is set to a plurality of factors.

14. The apparatus of claim 11, wherein the variable prohibit key corresponds to a time unit that is indicated by the variable factor when the password is input.

15. The apparatus of claim 11, wherein the password-matching unit determines whether the input password matches a preset password, and determines whether the variable prohibit key exists in the input password if the input password does not match the preset password.

16. The apparatus of claim 11, wherein, if the variable prohibit key exists in the input password, the control unit operates a system protection program to transmit an emergency call signal to a predetermined user or system.

17. An electronic device for preventing an illegal access, comprising:
- means for determining a prohibit key that is dynamically varied according to a predetermined variable factor,
- means for determining an existence of the determined dynamically-variable prohibit key in an input password only when the input password does not match an authorized password; and
- means for rejecting an access of a user to the system, if the dynamically-variable prohibit key exists in the input password.

18. An electronic device for setting a prohibit key, comprising:
- means for determining whether a prohibit key is set for a protection of a system;
- means for, if the prohibit key is set, setting a variable factor to dynamically vary the prohibit key and store the set variable factor; and
- means for rejecting an access of a user to the system if the dynamically-variable prohibit key exists in an input password when the input password does not match an authorized password.

* * * * *